K. KNUDSEN.
FLEXIBLE DRIVING MECHANISM.
APPLICATION FILED JULY 29, 1919.
1,366,891.
Patented Jan. 25, 1921.
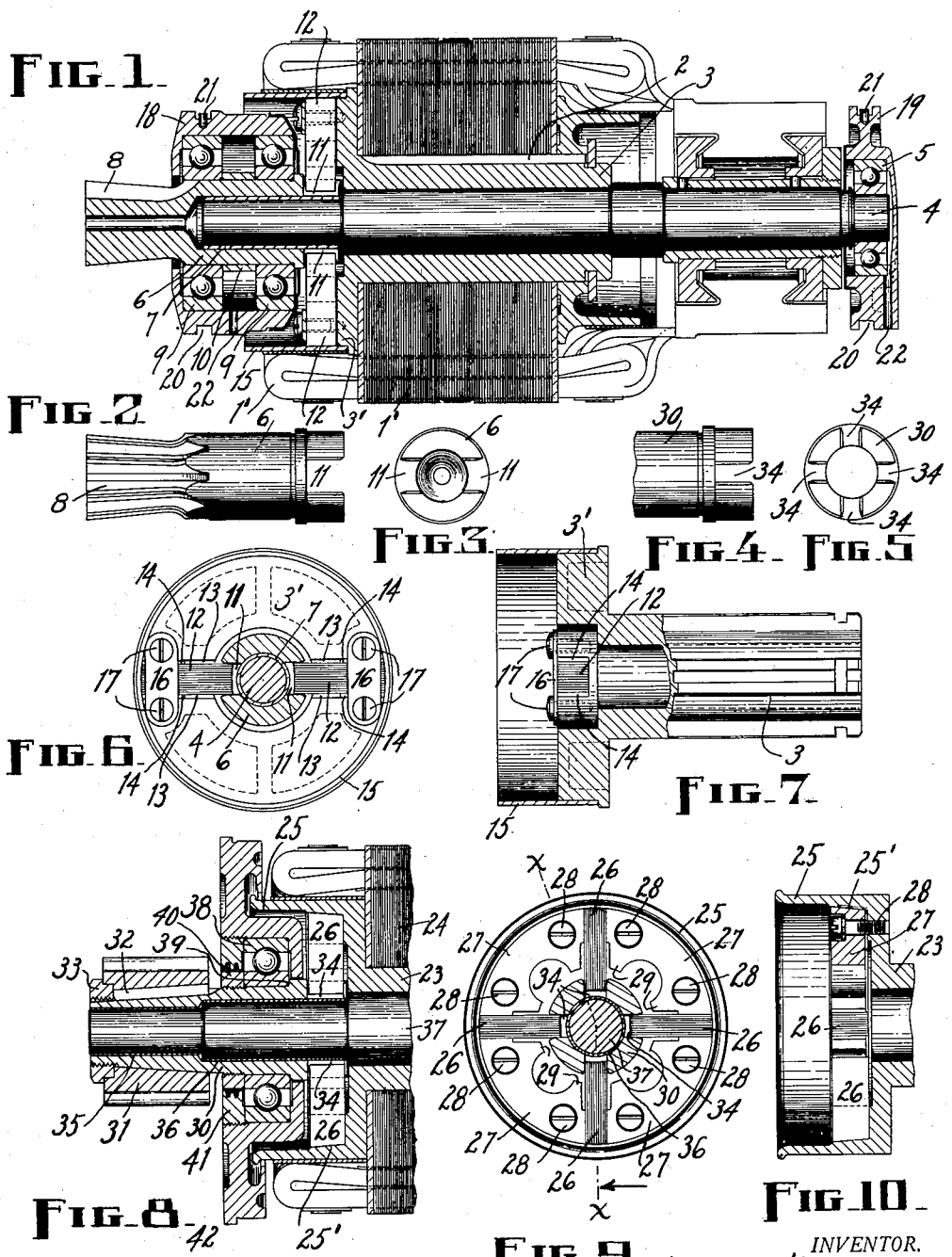
INVENTOR.
Karsten Knudsen,
BY
Frank A. Cutter,
ATTORNEYS.

UNITED STATES PATENT OFFICE.

KARSTEN KNUDSEN, OF GRAND RAPIDS, MICHIGAN, ASSIGNOR TO ELECTRIC WHEEL CO., ASSOCIATES, OF SPRINGFIELD, MASSACHUSETTS.

FLEXIBLE DRIVING MECHANISM.

1,366,891.      Specification of Letters Patent.      Patented Jan. 25, 1921.

Application filed July 29, 1919. Serial No. 314,082.

*To all whom it may concern:*

Be it known that I, KARSTEN KNUDSEN, a citizen of the United States of America, and a resident of Grand Rapids, in the county of Kent and State of Michigan, have invented new and useful Flexible Driving Mechanism, of which the following is a specification.

My invention relates to improvements in mechanism for transmitting power by high-speed, gear transmissions, as in electric-motor or other drivers wherein the momentums of the driving and driven members bear a sufficient relation in magnitude to each other, whether or not the driven member in any case be partly restrained from angular vibrating by outside forces, and resides generally in a pinion or equivalent member on the driving or driven member, as the case may be, either as one piece or fixed on a sleeve, and radial, yielding or resilient drivers with fixed ends driven from the driving member, and free ends operatively connected with or engaging said pinion or equivalent member or said sleeve, said pinion being driven by or through the medium of said drivers, together with such additional parts and members as may be needed or desired in order to render the mechanism complete and thoroughly practicable and efficient, all as hereinafter set forth.

Stops or abutments are provided for the aforesaid drivers, when the latter are deflected to a safe maximum extent, which is not reached, however, until the motor, assuming that the mechanism be used in connection with a motor, for example, be excessively overloaded or abused, whereby the active length of said drivers is reduced and their strength increased accordingly.

The same principle is involved in this mechanism that is involved in United States Letters Patent, No. 1,079,917, wherein a flexible drive is attained by means of a floating shaft. The present construction can be more widely adapted than can the other, and it possesses advantages of simplicity and cheapness in manufacture over the other.

One object of my invention is to reduce and in some cases almost eliminate the angular vibrations of the driving and driven members, in transmissions, due to imperfections in the gearing.

In mechanism of the character to which this invention relates, if the driving member or pinion have rigid connection with, for example, an electric armature body, it is necessary that the gearing be absolutely perfect in order that the driving and driven members shall revolve with uniform velocity. Reference has been made to what may be termed two orders of high-speed, gear transmission, namely, that wherein the momentums of the driving and driven members bear a sufficient relation in magnitude to each other, and that wherein, in addition to the foregoing, the driven member is partly restrained from angular vibrations by outside influences. If the mechanism come under one of these two orders and have a slight imperfection in the engaging parts of the gearing, angular vibrations will be produced, and the amplitude of the impulses which cause said vibrations may be found in many cases to be of a serious nature. The proper operation, designated as smooth running, is therefore seriously interfered with and greatly impaired and the life of the gearing materially shortened. This serious defect is practically eliminated as a factor by the use of my mechanism.

From the foregoing it follows that, when the gearing becomes worn sufficiently to obliterate or destroy the original tooth contour, so much backlash must occur that said gearing becomes noisy, and another object of my invention is to prevent or materially decrease the amount of such wear and so prevent chattering of the intermeshing members and other noises which they produce when loose.

Still another object is to provide means whereby the efficiency and life of the gearing are materially improved and prolonged or increased.

Other objects and advantages will appear in the course of the following description.

A preferred embodiment of my invention, whereby I attain the objects and secure the advantages of the same, is illustrated in the accompanying drawings, and I will proceed to describe said invention with reference to said drawings, although it is to be understood that the form, construction, arrangement, etc., of the parts in various aspects are not material and may be modified without departure from the spirit of the invention, some of the modifications appearing herewith.

In the drawings, in which similar characters of reference designate similar parts throughout several views, Figure 1 is a longitudinal, central section through an electric-motor armature having incorporated therewith or therein a practical embodiment of my invention; Fig. 2, a side elevation of the pinion shown in the preceding view; Fig. 3, an end elevation of said pinion; Fig. 4, a fragmentary portion of a slightly modified form of pinion; Fig. 5, an end elevation of said last-named pinion; Fig. 6, an end elevation in partial section of and through the parts shown in Fig. 1, taken at the left of the drivers and looking toward them; Fig. 7, a side elevation and partial section of certain of the members shown in the first view, including the outer end of one of said drivers; Fig. 8, a central, longitudinal section through portions of a motor and through the new mechanism, the pinion in this case being fixed on a driving sleeve instead of directly on the driving shaft, and other modifications being also illustrated; Fig. 9, an end elevation in partial section of and through parts shown in Fig. 8, the section being taken at the left of and looking toward the drivers, and, Fig. 10, a partially oblique, longitudinal section on lines $x-x$, of Fig. 9.

Referring first more particularly to Fig. 13, it will be observed that I therein show a core 1 of the armature of an electric motor, the winding, commutator, and other well-known elements of such armature being omitted from the description. The core 1 is keyed at 2 to a flanged sleeve or hub 3, and said hub is securely mounted on the shaft 4. The shaft 4 is provided with an ordinary ball-bearing 5 at the commutator end. A pinion 6 is mounted on the other terminal of the shaft 4, a bushing 7 being interposed between said shaft and said pinion. This pinion is of the beveled type and has teeth 8 at one end. It should be noted in passing that this motor, with the pinion 6, is of the type used in wheels having bevel-gears driven by pinions and designed especially for small, industrial, truck motor-wheels. The pinion 6 is provided with ordinary ball-bearings 9—9 separated by a spacer-sleeve 10. The said pinion is provided in the end opposite to that where the teeth 8 are located, which is the right-hand end in the present case, with radial slots 11—11 in which are received the inner terminals of radial, yielding or resilient drivers 12—12. The slots 11 are diametrically opposite to each other. The drivers 12, which are by preference made of laminated or leaf springs, are located in greater part in radial slots 13—13 in the face of the flanged portion of the hub 3, which flanged part is at the left-hand end of said hub, and designated as 3'. The slots 13 are, of course, radial to the axis of the hub 3, and each of said slots is wider than the thickness of the driver 12 therein, that is to say, of the combining thickness of the spring laminæ which constitute such driver. The fixed terminal of each driver 12 is spaced from the parallel sides of its slot 13 by means of plates or pads 14—14, one on each side of said driver, between the latter and the adjacent side of said slot. A space on both sides of each driver 12 extending inwardly from the pads 14 between which said driver is held is thus left. The lengths of the slots 13 and of the spaces above referred to are so proportioned relatively that, when the drivers are deflected, they will contact with the inner ends of the parallel sides of said slots, but the strength of said drivers is such that they are not deflected until the force exerted on them approaches the limit of safety for the driving and driven members. This limit of safety is so determined, with respect to the strength of the drivers, that the motor may be overloaded to a certain extent before said limit is reached.

A ring 15 is pressed onto the hub flange 3', to close the outer ends of the slots 13, provide a thrust-bearing for the ends of the drivers 12, and prevent the sides of said slots from spreading when the drivers are forced into place. The ring 15 also serves as a support for the armature coil 1' at one end. Straps 16—16 are fastened, by means of screws 17, to the outer face of the hub flange 3', across the slots 13 adjacent to their outer terminals and wherein the drivers 12 are fixed or secured, such screws passing through said straps to be tapped into the outer face of said flange. The pinion bearings 9 are located in a housing 18, and the bearing 5 is located in a housing 19. Said housings are provided with retaining flanges for lubricant, and are held in the motor frame (not shown) by parts which enter annular grooves 20—20 in said housings. Pins 21—21, which extend from the housings 18 and 19 radially into the grooves 20, facilitate or are instrumental in properly positioning the housings 18 and 19 relative to the aforesaid motor frame, and hold said housings against angular displacement when the motor is in operation. Oil holes are represented at 22.

It is now clear that, when the shaft 4 revolves, it carries with it the pinion 6, the rotary motion being transmitted through the hub 3, and the drivers 12, and that the latter, being resilient, take up all lost motion, cushion the driving and driven parts, and prevent backlash and the chattering noise, and wear that would result therefrom in the absence of said drivers. At the same time any excessive load thrown on the pinion 6, or any sudden shock to which said pinion is subjected, is absorbed as it were by the resilient drivers, and the running parts including the motor, are thus protected.

If desired more than two drivers may be employed, four being shown in Figs. 8, 9, and 10. These drivers are designated by the numeral 26. Here I show a hub 23 to which an armature core 24 is secured. The hub 23 has a coil-supporting, hollow flange 25 at the outer end. Within the annular chamber in the flange 25, at the innermost end, is an annular tapered part 25′. The outer, fixed ends of the drivers 26 are cut at an angle which corresponds with the tapered part 25′. Segmental blocks 27, which also at their outer or peripheral edges conform to the tapered part 25′, are provided. The blocks 27 are so proportioned as to enable them to be located between the drivers 26, where they are tightly and securely held in place by means of screws 28 which pass through said blocks and are tapped into the flange 25. Owing to the tapered formation of the parts the segments 27 are forced inwardly and toward the center by the screws 28, and consequently clamp and bind the drivers in place. The segments 27 are provided with offset, inwardly-extending projections 29 alongside of the drivers but spaced therefrom, to provide spaces which are similar to the spaces in the slots 13 between the pads 14 and the inner ends of said slots, and for the same reason. A driving sleeve is represented at 30 for a pinion 31. The sleeve 30 has a tapered outer portion upon which is fixed, by means of a key 32 and a nut 33, the pinion 31. Radial slots 34 are formed in the other end of the sleeve 30, as clearly shown in Figs. 4, 5, and 9, to receive the inner terminals of the drivers 26, just as the slots 11 receive the inner terminals of the drivers 12 in the first example. The sleeve 30 is provided on the inside with bushings 35 and 36 which have a close running fit with a shaft 37, which corresponds to the shaft 4, that part of said shaft 37 upon which said bushings and the sleeve 30 are mounted being stepped.

Owing to the fact that the shaft 37 has a long bearing in the driving sleeve 30, a single ball-bearing 38 is sufficient between said sleeve and a housing 42 which encircles the inner end portion of the sleeve. The ball-bearing 38 is pressed onto the sleeve 30 and held against a shoulder 39, at the inner end of said sleeve, by means of a nut 40. A screw-threaded ring 41 retains the ball-bearing 38 in the housing 42.

The operation of the second, flexible-driving mechanism is substantially the same as that of the first mechanism, only in the last described construction the transmission is through the drivers 26 to the pinion 31 by way of the sleeve 30, instead of directly to the pinion.

In closing, attention is called to another valuable feature of the invention, which is in the fact that the prime mover may be operated at an increased speed, whereby the cost of construction and maintenance and the space required for installation and occupancy are reduced without in any way impairing reliability or reducing efficiency.

It is to be understood that the driving and driven members or elements may be reversed or transposed in any case, so far as my invention is concerned, without altering the results obtained by the flexible driving mechanism, or lessening the advantages accruing from the use of such mechanism.

What I claim as my invention, and desire to secure by Letters Patent, is—

1. The combination, in flexible driving mechanism, with a driving element provided with an annular member, and a resilient radial driver attached at its outer terminal to said element, and normally standing clear of said element except at the point of attachment, said annular member serving as a thrust bearing for the outer end of said driver, of a driven element with which the inner free terminal of said driver loosely engages.

2. The combination, in flexible driving mechanism, with a driving element, and radial resilient drivers, said driving element being provided with retaining means to receive the outer terminal portions of said drivers, which means is continuous except at the points where said outer terminal portions of said drivers are received, of a driven element with which the inner free terminals of said driver are loosely engaged.

3. The combination, in flexible driving mechanism, with a driving element provided with an annular member, and resilient radial drivers, said driving element also being provided with retaining means to receive the outer terminal portions of said drivers, and being continuous except at the points where said outer terminal portions of said drivers are received, of a driven element with which the free terminals of said drivers loosely engage.

4. The combination, in flexible driving mechanism, with a driving element, and a resilient radial driver, said driving element being provided with retaining means to receive the outer terminal portion of said driver, which means has offsets on both sides of said driver, between the points of attachment of the driver and the inner edge portions of said retaining means, of a driven member with which the inner free terminal of said driver loosely engages.

KARSTEN KNUDSEN.

Witnesses:
AGNES KNUDSEN,
J. RAYMOND PLANK.